United States Patent
Ormsbee et al.

(10) Patent No.: US 10,150,426 B2
(45) Date of Patent: Dec. 11, 2018

(54) SYSTEMS AND METHODS FOR A MOUNTABLE ELECTRONIC DEVICE HOLDER

(71) Applicant: Nite Ize, Inc., Boulder, CO (US)

(72) Inventors: Bowden Ormsbee, Longmont, CO (US); Gregory M. Adelman, Boulder, CO (US); Ian M. Core, Pittsburgh, PA (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 15/688,683

(22) Filed: Aug. 28, 2017

(65) Prior Publication Data

US 2017/0355320 A1    Dec. 14, 2017

Related U.S. Application Data

(63) Continuation of application No. 14/861,493, filed on Sep. 22, 2015, now Pat. No. 9,744,913.

(60) Provisional application No. 62/054,871, filed on Sep. 24, 2014.

(51) Int. Cl.
*B60R 11/02* (2006.01)
*B60R 11/00* (2006.01)

(52) U.S. Cl.
CPC ... *B60R 11/0241* (2013.01); *B60R 2011/0008* (2013.01); *B60R 2011/0057* (2013.01); *B60R 2011/0089* (2013.01)

(58) Field of Classification Search
CPC ......... B60R 11/0241; B60R 2011/0008; B60R 2011/0057; B60R 2011/0089
See application file for complete search history.

(56) References Cited

U.S. PATENT DOCUMENTS

| 5,187,744 | A | 2/1993 | Richter |
| 5,931,440 | A | 8/1999 | Miller |
| 5,979,724 | A | 11/1999 | Lowenthal, Jr. et al. |
| 8,573,455 | B1 | 11/2013 | Brown |

(Continued)

FOREIGN PATENT DOCUMENTS

| CN | 201205899 Y | 3/2009 |
| CN | 202854644 U | 4/2013 |
| CN | 203832375 U | 9/2014 |

OTHER PUBLICATIONS

Office Action and Search Report dated Jun. 1, 2018 issued in parallel Chinese Patent App. No. 201510053384.8 (25 pages with English translation).

(Continued)

*Primary Examiner* — Corey N Skurdal
(74) *Attorney, Agent, or Firm* — Haynes and Boone, LLP

(57) ABSTRACT

A system for holding an electronic device includes a body and a connection device for connecting an electronic device to the body, at least a portion of the connection device attached to the body. The system further includes a clip, the clip having a top portion and a bottom portion, the clip attached to the body. The system further includes a cam lever, the cam lever oriented in the body and in communication with the clip, the cam lever having a first position and a second position, the first position characterized by the cam lever not engaging the clip, the second position characterized by the cam lever engaging the clip, and causing the top and bottom portion of the clip to be pushed together.

17 Claims, 4 Drawing Sheets

(56) References Cited

U.S. PATENT DOCUMENTS

| | | | |
|---|---|---|---|
| 8,602,376 B2* | 12/2013 | Vogel | F16M 11/14 248/187.1 |
| 8,757,461 B2 | 6/2014 | Zanetti | |
| 9,529,388 B1* | 12/2016 | Mchatet | F16M 11/041 |
| 9,765,921 B2* | 9/2017 | Vogel | F16M 11/14 |
| 2004/0118985 A1* | 6/2004 | Omps | F16C 11/0619 248/181.1 |
| 2005/0247845 A1* | 11/2005 | Li | F16M 11/14 248/346.5 |
| 2007/0099469 A1* | 5/2007 | Sorensen | A45F 5/02 439/289 |
| 2009/0196597 A1* | 8/2009 | Messinger | F16M 11/14 396/427 |
| 2012/0097723 A1 | 4/2012 | Khatchatrian | |
| 2013/0078855 A1* | 3/2013 | Hornick | H01R 13/73 439/571 |
| 2014/0103087 A1 | 4/2014 | Fan | |
| 2014/0138419 A1 | 5/2014 | Minn et al. | |
| 2014/0265765 A1 | 9/2014 | Khodapanah et al. | |
| 2016/0138754 A1* | 5/2016 | Li | F16M 13/022 248/206.5 |
| 2016/0159291 A1 | 6/2016 | Haymond et al. | |
| 2016/0174396 A1 | 6/2016 | Wang | |
| 2016/0229352 A1 | 8/2016 | Zhang | |
| 2016/0318455 A1* | 11/2016 | Zhang | F16M 11/105 |
| 2016/0373152 A1* | 12/2016 | Schmidt | H04B 1/3877 |

OTHER PUBLICATIONS

International Preliminary Report on Patentability dated Mar. 28, 2017 issued in related PCT App. No. PCT/US2015/051448 (6 pages).

International Search Report dated Dec. 14, 2015 issued in related PCT App. No. PCT/US2015/051448 (2 pages).

European search report dated Apr. 26, 2018 issued in related European App. No. 15845216.9 (6 pages).

* cited by examiner

SYSTEMS AND METHODS FOR A MOUNTABLE ELECTRONIC DEVICE HOLDER

CROSS-REFERENCE TO RELATED APPLICATIONS

This application is a continuation of U.S. patent application Ser. No. 14/861,493 filed on Sep. 22, 2015 which issued to U.S. Pat. No. 9,744,913 on Aug. 29, 2017, which claims the benefit of U.S. Provisional Patent Application No. 62/054,871, filed Sep. 24, 2014, both of which are incorporated by reference herein in their entirety for all purposes.

BACKGROUND

Electronic devices, including smart phones, have become ubiquitous and provide users a variety of tools for navigation, information, and entertainment. These devices can deliver audio and visual information to the user, even when the user is not directly holding or manipulating the device. Users may desire to operate other things, such as cars or other vehicles, while receiving information from the electronic device or smart phone. In order to receive information from the electronic device, the device may need to be oriented so the user can see it. Therefore, a holder for the device is desirable.

SUMMARY

In one embodiment, a system for holding an electronic device includes a body and a connection device for connecting an electronic device to the body, a least a portion of the connection device attached to the body. The system further includes a clip, the clip having a top portion and a bottom portion, the clip attached to the body. The system further includes a cam lever, the cam lever oriented in the body and in communication with the clip, the cam lever having a first position and a second position, the first position characterized by the cam lever not engaging the clip, the second position characterized by the cam lever engaging the clip and causing the top and bottom portion of the clip to be pushed together. Optionally, the cam lever is mounted on a pivot point interconnected with the body, and the cam lever rotating about the pivot point is asymmetrically shaped, such that a first side of the cam lever extends a lesser distance from the pivot point than a second side of the cam lever; and in the second position, the second side pushes against the clip, and in the first position the first side contacts the clip. In one configuration, the clip has a V-shape and a vertex of the V-shape is located in the body, and the top portion and the bottom portion are located at ends of the V-shape. Optionally, the top portion and the bottom portion are wider than the clip proximate to the vertex of the V-shape. Alternatively, the top portion and the bottom portion of the clip are positioned a distance complementary for engaging a vent system of an automobile. In one alternative, the top portion and bottom portion of the clip include a cut-away portion for engaging with a vertical slat of a vent. Optionally, the top portion and the bottom portion include a rubberized coating. Alternatively, the attachment device includes a semicircular portion. Optionally, the attachment device includes a removable plate, the removable plate including magnetizable material, and the semicircular portion including magnetizable material, the removable plate being removably attached to the semicircular portion via magnetism. In one configuration, one of the removable plate and the semicircular portion includes a magnet. In another configuration, the removable plate has a front surface, said front surface having an indentation, said indentation capable of receiving a curved end of the semicircular section and being of a size which can encompass a portion, but less than the whole diameter, of the curved end of the semicircular section, the removable plate including a first piece of high-friction elastomeric material, the first piece of high-friction elastomeric material disposed of in the indentation of said removable plate and the magnetizable material of the removable plate positioned such that the magnetizable material surrounds the first piece of high-friction elastomeric material. Optionally, a second piece of high-friction elastomeric material surrounds the magnetizable material.

In another embodiment, a system for mounting an electronic device in a vehicle having a ventilation system includes vents having horizontal and vertical slats, the system includes a body and a connection device for connecting an electronic device to the body, at least a portion of the connection device attached to the body. The system further includes a clip, the clip having a top portion and a bottom portion, the clip attached to the body. The clip has a V-shape, and a vertex of the V-shape is located in the body, and the top portion and the bottom portion are located at ends of the V-shape, and the top portion and the bottom portion are wider than the clip proximate to the vertex of the V-shape. The system further includes a cam lever, the cam lever oriented in the body and in communication with the clip, the cam lever having a first position and a second position, the first position characterized by the cam lever not engaging the clip, the second position characterized by the cam lever engaging the clip, and causing the top and bottom portion of the clip to be pushed together and clamp a horizontal slat of the vents. Optionally, the top portion and the bottom portion of the clip are positioned a distance complementary for engaging a vent system of an automobile. Alternatively, the top portion and bottom portion of the clip include a cut-away portion for engaging with a vertical slat of a vent. Optionally, the cam lever is positioned in relation to the body such that when the clip engages the vent system, the cam lever operates as a brace to prevent the closing of slats of the vent system. In one configuration, the semicircular portion is a portion of a hollow ball. Optionally, the attachment device includes a semicircular portion, and the attachment device includes a removable plate, the removable plate including magnetizable material, and the semicircular portion including magnetizable material, the removable plate being removably attached to the semicircular portion via magnetism. In one configuration, one of the removable plate and the semicircular portion include a magnet. In one alternative, the removable plate has a front surface, said front surface having an indentation, said indentation capable of receiving a curved end of the semicircular section and being of a size which can encompass a portion, but less than the whole diameter, of the curved end of the semicircular section, the removable plate including a first piece of high-friction elastomeric material, the first piece of high-friction elastomeric material disposed of in the indentation of said removable plate, and the magnetizable material of the removable plate positioned such that the magnetizable material surrounds the first piece of high-friction elastomeric material. In another alternative, a second piece of high-friction elastomeric material surrounds the magnetizable material.

In one embodiment, a method of attaching an electronic device to a vent includes providing a system for mounting an electronic device, the system including a body and a connection device for connecting an electronic device to the body, a least a portion of the connection device attached to the body. The system further includes a clip, the clip having a top portion and a bottom portion, the clip attached to the body. The clip has a V-shape, and a vertex of the V-shape is located in the body, and the top portion and the bottom portion are located at ends of the V-shape, and the top portion and the bottom portion are wider than the clip proximate to the vertex of the V-shape. The system further includes a cam lever, the cam lever oriented in the body and in communication with the clip, the cam lever having a first position and a second position, the first position characterized by the cam lever not engaging the clip, the second position characterized by the cam lever engaging the clip and causing the top and bottom portion of the clip to be pushed together and clamp. The method further includes placing the top portion and the bottom portion of the clip on either side of a horizontal vent slat of the vent. The method further includes rotating the cam lever from the first position to the second position and clamping the horizontal vent slat. Optionally, the method includes attaching a removable plate to the electronic device, the removable plate being part of the attachment device; engaging a semicircular portion with the removable plate. The attachment device includes the semicircular portion, the removable plate including magnetizable material, and the semicircular portion including magnetizable material, the removable plate being removably attached to the semicircular portion via magnetism.

DETAILED DESCRIPTION OF THE DRAWINGS

Embodiments of a vent mounted electronic device holder generally include a mounting end for mounting to a vent or other area of a vehicle, and a connection end for connecting an electronic device to a vent mounted electronic device. In many embodiments, the mounting end includes a clamp (or clip) portion that clamps on the vent of a vehicle. The clamp portion is specially sized and shaped to easily attach to most car vents that provide for heating and cooling of vehicles. In many embodiments, the connection end includes a magnetic connection device for attaching to an electronic device. In various alternatives, other interconnection devices may be used.

Figure 1:
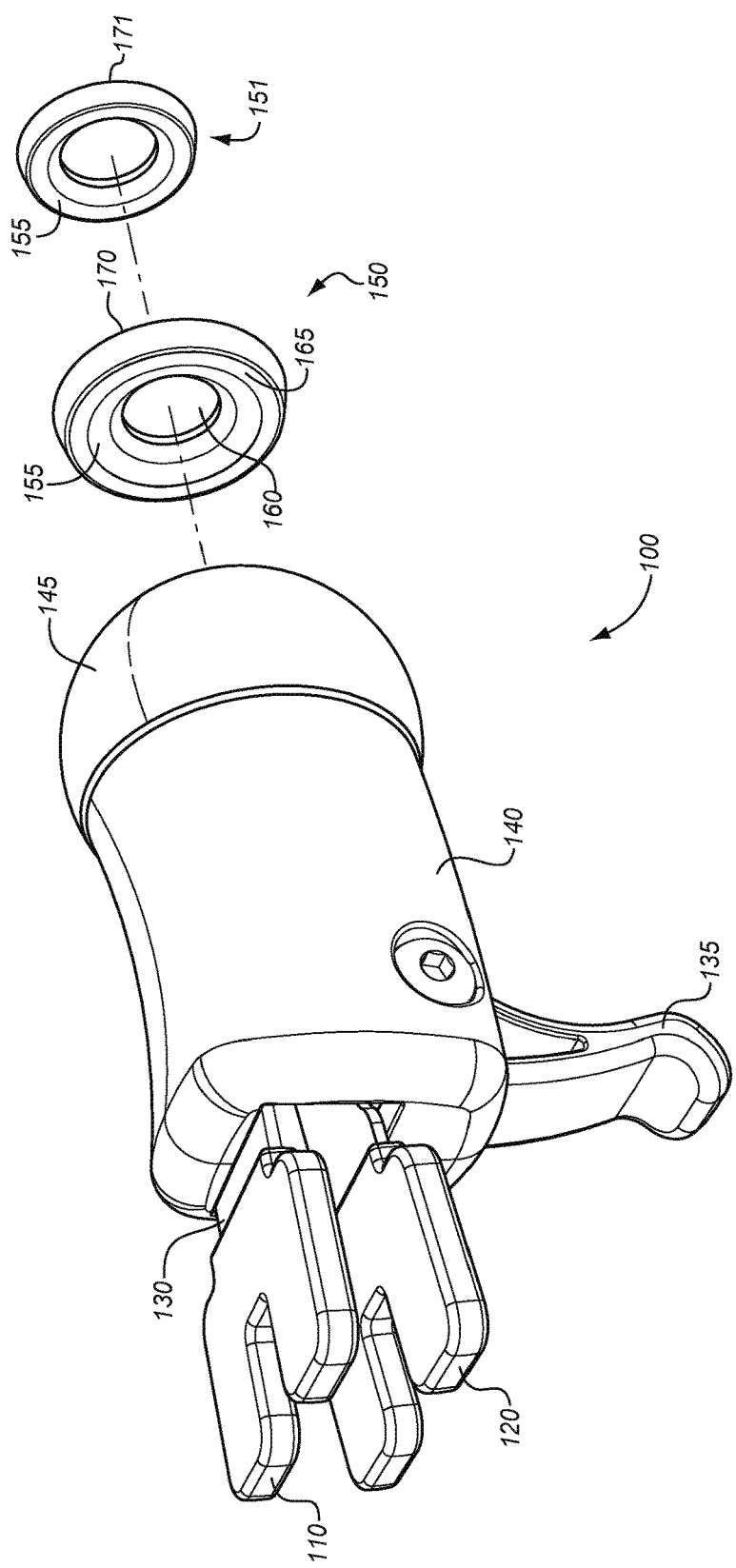
FIG. 1 shows a perspective view of one embodiment of a vent mounted electronic device holder.

FIG. 1 shows a perspective view of one embodiment of a vent mounted electronic device holder 100. The top 110 and bottom 120 portions of clip 130 are visible in this picture. The distance between the top 110 and bottom 120 portions of clip 130 may be optimized to fit with vents in some embodiments. Vent slats are approximately 1-5 mm thick, so the device is oriented to provide a grip on such a thickness and be removable from such a thickness. Generally, the clip portion is used for attaching to the vent of a vehicle. Cam lever 135 is used to tighten the hold of clip 130 to the vent. The clip 130 is interconnected to body portion 140A, B. On the opposing end, semicircular portion 145 is used for attaching to an electronic device. Cam lever 135 in operation also extends away from the body portion 140A, B. In this configuration, when the vent mounted electronic device holder 100 engages a vent, the cam lever 135 can prevent the vent slats from further tilting and the vent from closing by operating as a bracing lever. Semicircular portion 145 is typically made of metal and it is receptive to magnetism or includes a core or layer directly below the core that is receptive to magnetism. Semicircular portion 145 may be hollow or in some embodiments may be solid. In some configurations, the hollow nature of the ball limits the torque applied by the vent mounted electronic device holder 100, as the portion of the device extending away from the vent acts a lever arm and the effect of weight at the end of the lever arm may increase forces on the vent. In operation semicircular portion provides a magnetizable rounded surface. Semicircular portion 145 is designed to interface with a magnetic ring piece 150 that includes a circular magnet 155 and inner and outer high-friction material 160, 165. The magnetic ring piece is mounted in a body 170 which includes an adhesive back or other means for attaching to the surface of an electronic device. Alternatively, semicircular portion 145 may interface with a magnetic ring piece 151. This magnetic ring piece 151 includes a circular magnet 155 and an inner high-friction material 160 mounted in a body 171 which includes an adhesive back or other means for attaching to the surface of an electronic device. Magnetic ring piece 151 omits the outer high-friction material. These magnetic ring pieces and the vent mounted electronic device holder 100 may be produced in different relative sizes and different sizes than shown and not all parts shown may be to scale.

Figure 2:
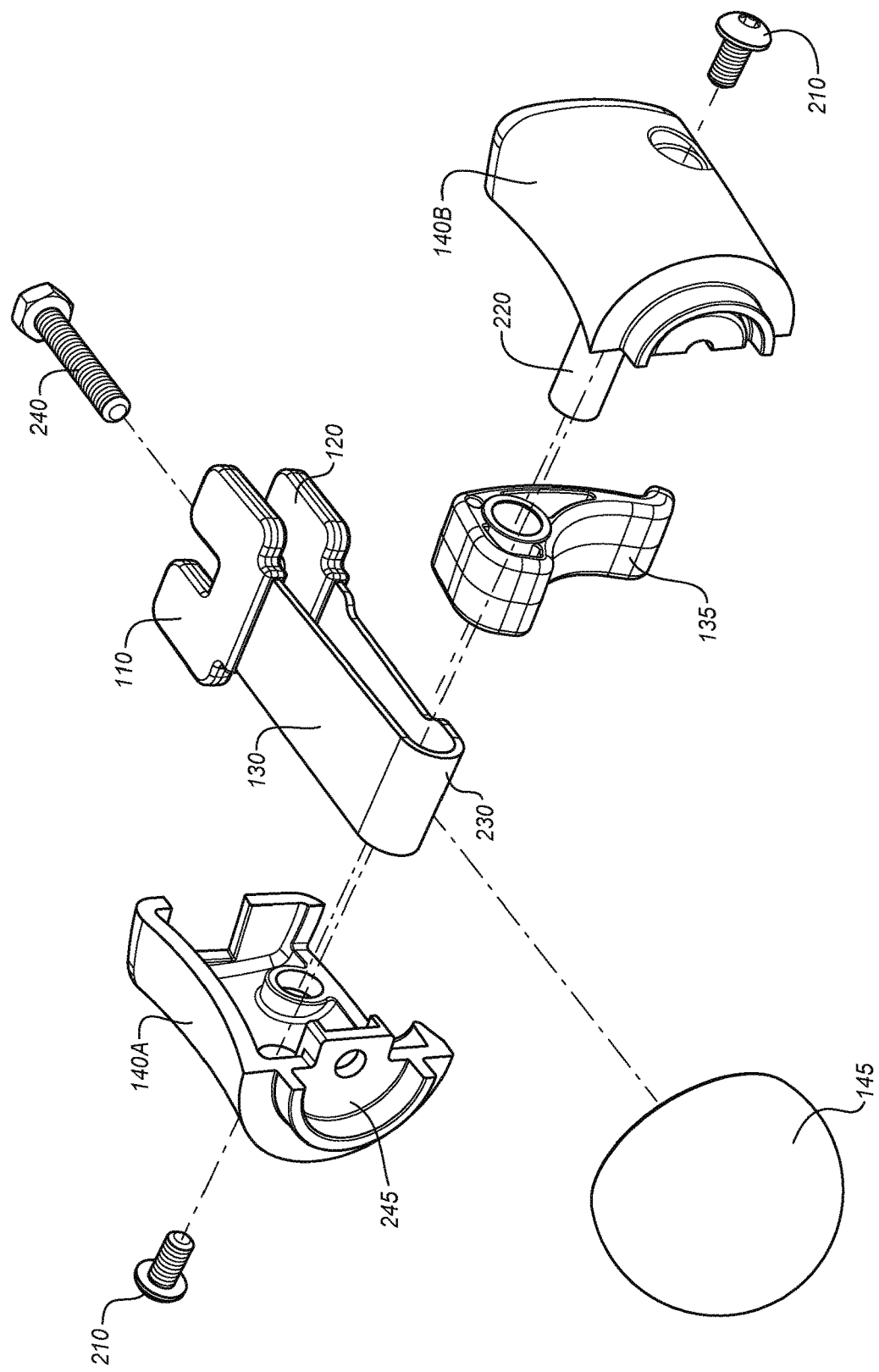
FIG. 2 shows an exploded view of the vent mounted device holder of FIG. 1.

FIG. 2 shows an exploded view of the vent mounted electronic device holder 100. Semicircular portion 145 is shown to be cut off as to integrate with body portion 140A, B. Body portion 140A, B is shown as being divided into two pieces that fit together in an interlocking manner and are held together using screws 210. Screws 210 also serve to interconnect with cam lever 135 and spacer 220. Clip 130 is clearly seen as including a bend portion. Screw 240 passes through hole 245 and provides for the attachment of semicircular portion 145 to body portion 140A, B. In operation, the user turns cam lever 135, which due to the shape of cam lever 135 and the axis of rotation of cam lever 135, presses the lever against clip 130 causing it to grip anything between the top and bottom 110, 120 portions. Top and bottom portions 110, 120 also include a rubberized coating to improve the gripping of a vent. In many configurations, a semicircular shape is hollowed out to reduce weight and levered forces on the clip interconnection device. In alternatives, the clip 130 may be spring loaded instead of controlled by the cam lever, or oriented to provide pressure to the vent slats in a variety of other fashions.

Figure 3:
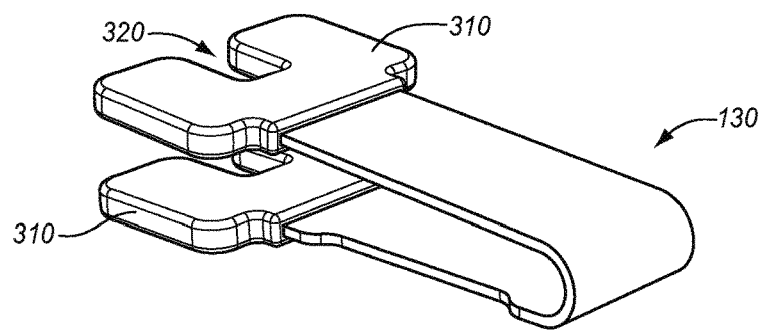
FIG. 3 shows a detailed perspective view of the clip of the vent mounted electronic device holder of FIG. 1.

FIG. 3 shows a close-up view of the clip 130. In this view, rubberized coatings 310 are clearly seen. In many embodiments, rubberized coatings 130 are applied via an overmold procedure. These coatings may have a durometer of 40 Shore A. These coatings improve the grip of the clip on the vent slats. Void 320 is included to accommodate vertical slats that are many times included in vents.

Figure 4:
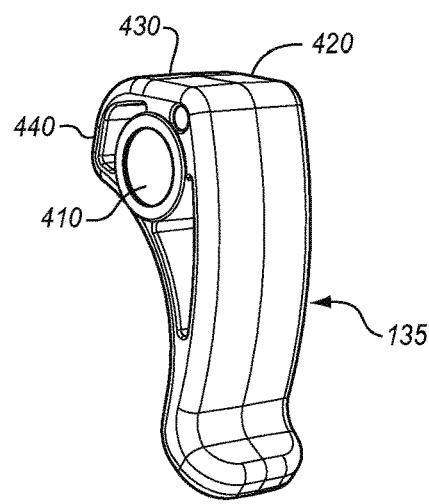
FIG. 4 shows a detailed perspective view of the cam lever of the vent mounted device holder of FIG. 1.

FIG. 4 shows cam lever 135 in a detailed view. Cam lever 135 rotates about aperture 410 in operation. Cam lever 135 is not symmetrically shaped about aperture 410 that pivots about a pivot point on the body portion 130. Instead, side 420 extends a lesser distance from the center of aperture 410 as compared to side 430. Therefore, in operation, when side 420 engages clip 130, less pressure is applied to the clip as compared to when side 430 is engaged with clip 130. Furthermore, rounded corner 440 protrudes even a greater distance from the center of aperture 410. Thus in operation, when the user rotates the cam lever 135 from engaging side 420 to engaging side 430, corner 440 must be overcome and corner 440 prevents cam lever 135 from rotating back to side 420 unless a significant amount of pressure is applied, effectively locking the cam lever in place. Cam lever 135 may be made of polycarbonate. In some embodiments, grease may be applied to cam lever 135 to ease the turning against clip 130.

Figure 5:
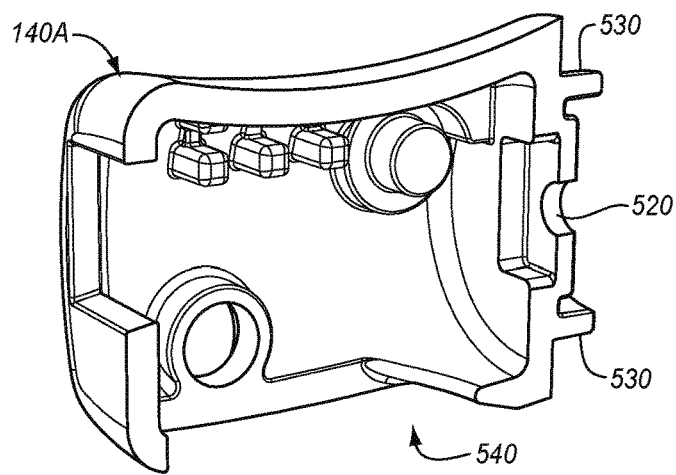
FIG. 5 shows a cutaway perspective view of the body of the vent mounted device holder of FIG. 1.

FIG. 5 shows a cutaway view of body portion 140A. The inner hollowed out portion body portion 140A includes an aperture 510 for mounting cam lever 135. Body portion 140A further includes a screw hole 520 for mounting semicircular portion 145. Protrusion 530 extends from body portion 140A to brace semicircular portion 145. Body portion 140A also includes a cutout 540 for cam lever 135 and a cutout for clip 130.

Figure 6:
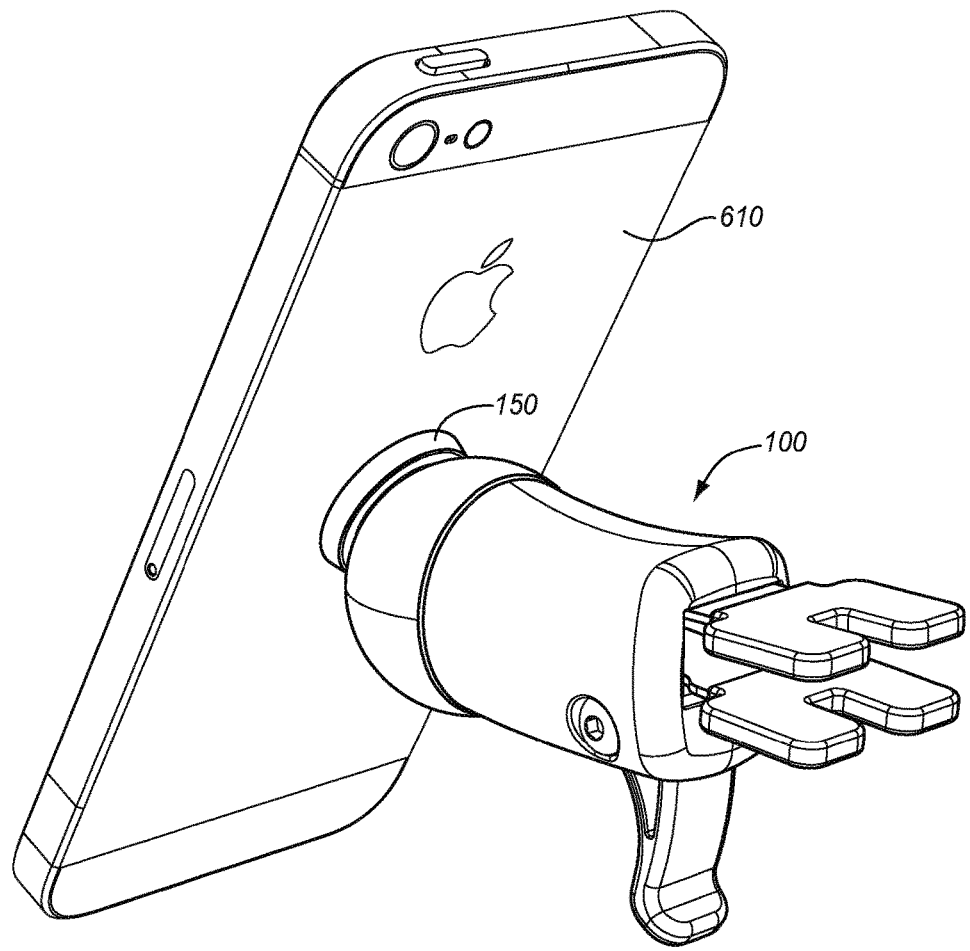
FIG. 6 shows a perspective view of the vent mounted device holder of FIG. 1 in use.

FIG. 6 is a perspective view showing the vent mounted electronic device holder 100 in operation. Disk 150 is attached to the vent mounted electronic device holder 100 via semicircular portion 145. Disk 150 includes an adhesive back that attaches to an electronic device or other object. Disk 150 may alternatively be integrated into a case for an electronic device or any other object. In the embodiments shown, disk 150 includes a magnet, and semicircular portion 145 is composed of metal that is attracted by magnets.

In operation, the clip 130 of the vent mounted electronic device holder 100 engages the vent slats of a vehicle's ventilation system. Clip 130 acts as a spring applying a pressure force to cam lever 135. Once clip 130 is engaged with the slats, cam lever 135 may be rotated, which applies pressure to clip 130 due to the asymmetrical shape of cam lever 135 about aperture 410. In this way, clip 130 grips the vent slats. Although the device is designed to work complementarily with car vents, it may be mounted on any object. In alternative embodiments, the vent mounted electronic device holder 100 may be used as a stand by attaching the clip to another object. Optionally, the clip 130 and cam lever 135 portions of the vent mounted electronic device holder 100 may for the base of a stand as well.

The previous detailed description is of a small number of embodiments for implementing the systems and methods for a vent mounted electronic device holder and is not intended to be limiting in scope. The following claims set forth a number of the embodiments of the systems and methods of the vent mounted electronic device holder disclosed with greater particularity.

What is claimed:

1. A system for holding an electronic device, comprising:
 a body;
 a connection device for connecting an electronic device to the body, at least a portion of the connection device attached to the body, wherein the connection device includes a semicircular portion and a removable plate, the removable plate including magnetizable material, and the semicircular portion including magnetizable material, the removable plate being removably attached to the semicircular portion via magnetism, and one of the removable plate and the semicircular portion include a magnet, and wherein the connection device includes a semicircular portion, wherein the semicircular portion is a portion of a hollow ball, wherein the semicircular portion includes an outer layer that is magnetic;
 a clip portion, connected to the body opposite the connection device, the clip portion configured to attach to the vent of a vehicle.

2. The system of claim 1, wherein one of the removable plate and the semicircular portion include a magnet.

3. The system of claim 2, wherein the removable plate has a front surface, said front surface having an indentation, said indentation capable of receiving a curved end of the semicircular section and being of a size which can encompass a portion, but less than the whole diameter, of the curved end of the semicircular section, the removable plate including a first piece of high-friction elastomeric material, the first piece of high-friction elastomeric material disposed of in the indentation of said removable plate, and the magnetizable material of the removable plate positioned such that the magnetizable material surrounds the first piece of high-friction elastomeric material.

4. The system of claim 3, wherein a second piece of high-friction elastomeric material surrounds the magnetizable material.

5. The system of claim 2, wherein the semicircular portion includes a core that is magnetic.

6. The apparatus of claim 2, wherein the semicircular portion includes a layer under an outer layer that is magnetic.

7. The system of claim 1, wherein the connection device includes a removable plate, the removable plate including magnetizable material, and an outer portion of the semicircular portion is not magnetic but an inner portion includes magnetizable material, the removable plate being removably attached to the semicircular portion via magnetism.

8. An apparatus for holding an electronic device, comprising:
 a semicircular portion, the semicircular portion being a portion of a hollow ball;
 a removable plate, the removable plate including a magnetizable material and the semicircular portion including magnetizable material, the removable plate being removably attached to the semicircular portion via magnetism, wherein the semicircular portion is a portion of a hollow ball, wherein the semicircular portion includes an outer layer that is magnetic;
 a clip portion, connected to the body opposite the connection device, the clip portion configured to attach to the vent of a vehicle.

9. The apparatus of claim 8, wherein the semicircular portion includes a core that is magnetic.

10. The apparatus of claim 8, wherein the semicircular portion includes a layer under an outer layer that is magnetic.

11. The apparatus of claim 8, wherein one of the removable plate and the semicircular portion include a magnet.

12. The apparatus of claim 11, wherein the removable plate has a front surface, said front surface having an indentation, said indentation capable of receiving a curved end of the semicircular section and being of a size which can encompass a portion, but less than the whole diameter, of the curved end of the semicircular section, the removable plate including a first piece of high-friction elastomeric material, the first piece of high-friction elastomeric material disposed of in the indentation of said removable plate, and the magnetizable material of the removable plate positioned such that the magnetizable material surrounds the first piece of high-friction elastomeric material.

13. The apparatus of claim 12, wherein a second piece of high-friction elastomeric material surrounds the magnetizable material.

14. The apparatus of claim 8, wherein the semicircular portion includes a core that is magnetic.

15. The apparatus of claim 8, wherein the semicircular portion includes a layer under an outer layer that is magnetic.

16. The apparatus of claim 8, wherein the semicircular portion is attached to a body that provides for mounting of the semicircular portion.

17. The apparatus of claim 8, wherein the removable place is attachable to the electronic device.

\* \* \* \* \*